United States Patent
Karim et al.

(10) Patent No.: US 7,010,675 B2
(45) Date of Patent: Mar. 7, 2006

(54) FETCH BRANCH ARCHITECTURE FOR REDUCING BRANCH PENALTY WITHOUT BRANCH PREDICTION

(75) Inventors: Faraydon O. Karim, San Diego, CA (US); Ramesh Chandra, San Diego, CA (US)

(73) Assignee: STMicroelectronics, Inc., Carrollton, TX (US)

( * ) Notice: Subject to any disclaimer, the term of this patent is extended or adjusted under 35 U.S.C. 154(b) by 461 days.

(21) Appl. No.: 09/917,290

(22) Filed: Jul. 27, 2001

(65) Prior Publication Data

US 2003/0023838 A1    Jan. 30, 2003

(51) Int. Cl.
G06F 9/30      (2006.01)

(52) U.S. Cl. ..................................... 712/235
(58) Field of Classification Search ............... 712/235, 712/237
See application file for complete search history.

(56) References Cited

U.S. PATENT DOCUMENTS 5,127,091 A * 6/1992 Boufarah et al. ........... 712/238
5,615,386 A * 3/1997 Amerson et al. ........... 712/238
5,696,958 A * 12/1997 Mowry et al. .............. 712/235
6,067,644 A    5/2000 Levine et al.
6,289,445 B1 * 9/2001 Ekner ......................... 712/244

FOREIGN PATENT DOCUMENTS

| EP | 0 190 484 | 8/1986 |
| EP | 0 378 425 | 7/1990 |
| EP | 0 851 344 | 7/1998 |

* cited by examiner

*Primary Examiner*—Eddie Chan
*Assistant Examiner*—Aimee Li
(74) *Attorney, Agent, or Firm*—Lisa K. Jorgenson; William A. Munck

(57) ABSTRACT

In lieu of branch prediction, a merged fetch-branch unit operates in parallel with the decode unit within a processor. Upon detection of a branch instruction within a group of one or more fetched instructions, any instructions preceding the branch are marked regular instructions, the branch instruction is marked as such, and any instructions following branch are marked sequential instructions. Within two cycles, sequential instructions following the last fetched instruction are retrieved and marked, target instructions beginning at the branch target address are retrieved and marked, and the branch is resolved. Either the sequential or target instructions are then dropped depending on the branch resolution, incurring a fixed, 1 cycle branch penalty.

20 Claims, 2 Drawing Sheets

FETCH BRANCH ARCHITECTURE FOR REDUCING BRANCH PENALTY WITHOUT BRANCH PREDICTION

TECHNICAL FIELD OF THE INVENTION

The present invention is directed, in general, to branch processing and, more specifically, to branch processing in pipelined processors without utilizing branch prediction to avoid branch performance penalties.

BACKGROUND OF THE INVENTION

Similar to an assembly line for producing a complex product in a manufacturing plant, pipelining is widely used in integrated circuit designs to improve performance. In processors, such performance improvement is achieved through parallelization of sequential computations, generally through separate computational elements. Being simpler, these individual computational elements can run at faster clock speeds, leading to performance gains.

Aggressive pipelining in synchronous systems does not always lead to more efficient designs since there are some drawbacks associated with heavily pipelined designs. Deeper pipelines imply higher computation latencies, so that scheduling operations through the various pipeline stages in complex designs such as processors also complicates the controller design.

During execution of a series of operations, the change of program flow due to instructions such as a jump or a function call (or similar branching instructions) lead to loss of performance in pipelined processors. By the time a decision is made to begin executing instructions from a different memory address than the one currently being executed (i.e., a different branch), a number of instructions from the current instruction flow are already executing at various stages within the pipeline. These undesired instructions consume useful processor resources, resulting in a loss of performance generally termed as "branch penalty". Higher numbers of pipeline stages generally lead to higher branch penalties.

To avoid significant loss of processor performance due to branch penalties, most contemporary high performance processors utilize some type of branch prediction. One techniques commonly employed involves predicting the results of a conditional branch at the instruction fetch stage based on previous history of the branch instructions, which adds to the general complexity of the processor design.

By way of example, a typical processor pipeline generalized for any modern processor is shown in FIG. 3. The elements shown are arranged according to the pipeline sequence (top down) rather than by layout within a processor. Within the pipeline design shown, branch instructions are first detected at the decode stage and subsequently processed by the branch processing unit, which (as shown) is generally found at the same pipeline stage as other execution units. The branch processing unit resolves the branch and computes a new address from which to fetch the next instruction(s). The new fetch address must then be communicated back to the fetch/pre-fetch unit, located at the top or beginning of the pipeline stages.

Due to the large gap between the fetch and branch-processing unit, the intermediate pipeline stages are filled with speculative instructions. Depending on the nature of the branch prediction scheme, these speculative instructions will involve a certain mix of sequential or target instructions. If the branch resolves to be not taken, then the sequential instructions in the pipeline may continue with execution, whereas the target instructions need to be dropped. If the branch resolves to be taken, on the other hand, the target instructions should proceed normally while the sequential instructions are aborted.

Depending on the length of a pipeline, the branch penalty in terms of performance loss due to dropping sequential or target instructions from the pipeline may be significant and requires effective branch prediction schemes to minimizes performance losses.

While most modern processors achieve high performance through aggressive pipelining and complex designs with attendant high silicon area, packaging and cooling costs, these higher cost penalties for performance improvement are generally considered acceptable for mainstream processors employed in workstations. Other applications, however, may require high performance but also need to limit the size and/or complexity of the processor. For example, a network processing system which employs a cluster of processor cores (e.g., eight or more) may require a high performance processor design while limiting the complexity of the microarchitecture.

There is, therefore, a need in the art for instruction fetch and branch processing obtaining high performance using a simple pipeline design without any branch prediction.

SUMMARY OF THE INVENTION

To address the above-discussed deficiencies of the prior art, it is a primary object of the present invention to provide, for use in processor, a merged fetch-branch unit which operates in parallel with the decode unit in lieu of branch prediction. Upon detection of a branch instruction within a group of one or more fetched instructions, any instructions preceding the branch are marked regular instructions, the branch instruction is marked as such, and any instructions following branch are marked sequential instructions. Within two cycles, sequential instructions following the last fetched instruction are retrieved and marked, target instructions beginning at the branch target address are retrieved and marked, and the branch is resolved. Either the sequential or target instructions are then dropped depending on the branch resolution, incurring a fixed, 1 cycle branch penalty.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

Figure 1:
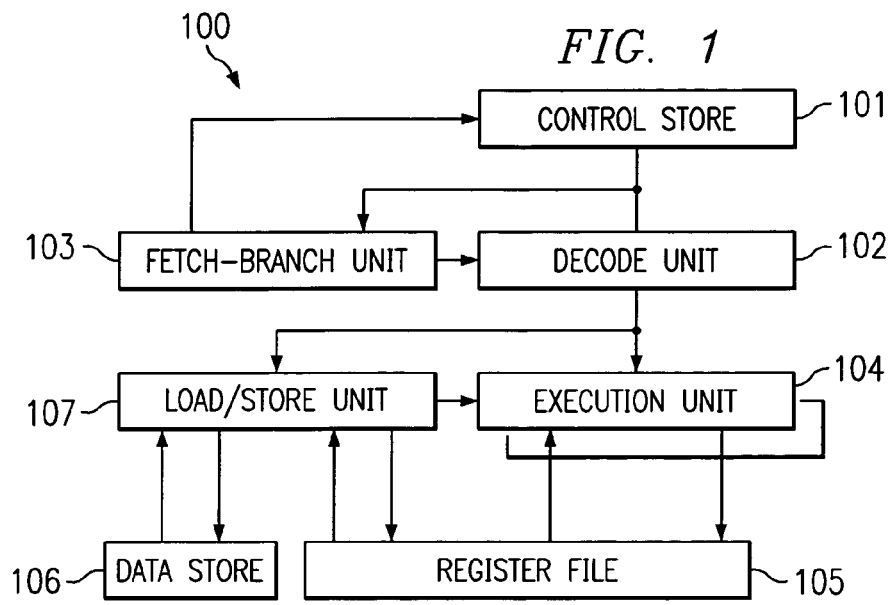
FIG. 1 depicts a processor pipeline design according to one embodiment of the present invention.
Figure 3:
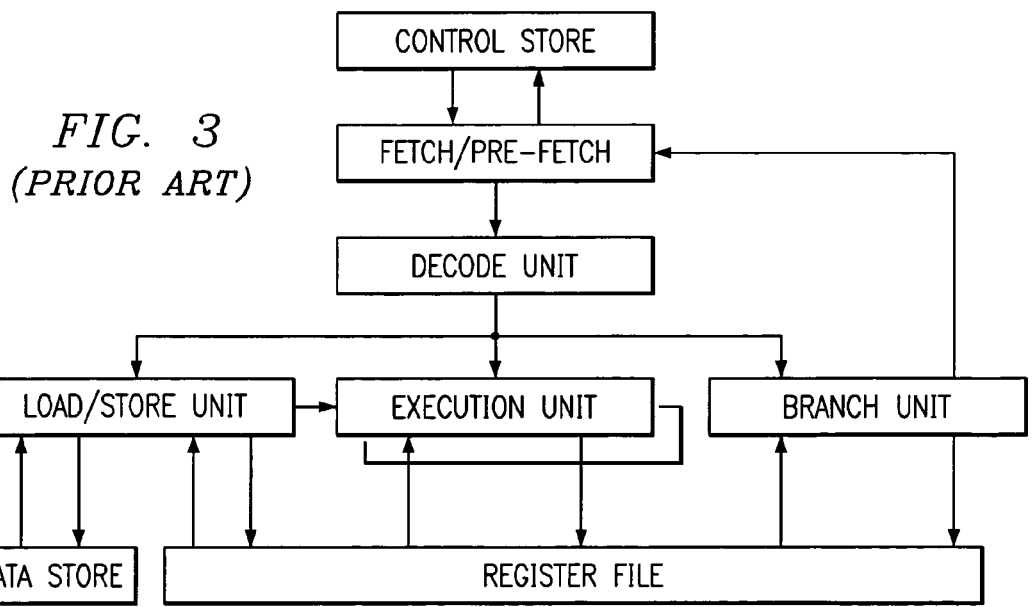
FIG. 3 is a block diagram of a generalized processor pipeline design for existing processors.
Figure 2:
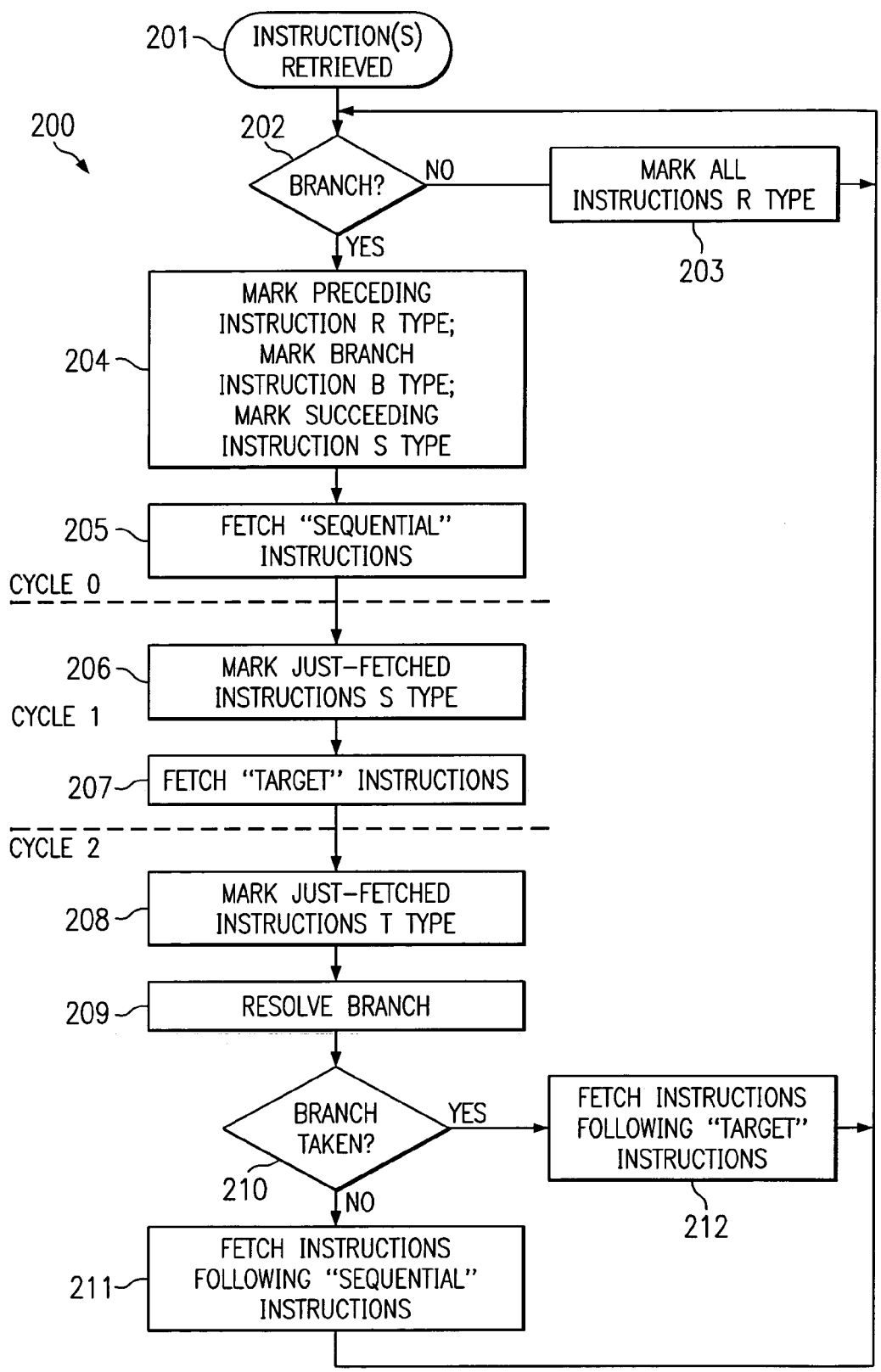
FIG. 2 is a high level flow chart for a process of fetch-branch processing according to one embodiment of the present invention.

FIGS. 1 and 2, discussed below, and the various embodiment used to describe the principles of the present invention in this patent document are by way of illustration only and should not be construed in any way to limit the scope of the invention. Those skilled in the art will understand that the principles of the present invention may be implemented in any suitably arranged device.

FIG. 1 depicts a processor pipeline design according to one embodiment of the present invention. Since the present invention may be practiced in conjunction with most conventional pipelined processor designs, FIG. 1 does not depict a complete processor or all elements and connections within a processor, but instead only so much of the design for a processor as is either required to understand the present invention and/or unique to the present invention is shown.

Processor 100 includes a control store (instruction cache) 101 containing instructions retrieved from system memory (not shown) and/or nonvolatile memory (e.g., a magnetic hard disk, also not shown) for execution. Receiving instructions from control store 101 are a decode unit 102 and a fetch (and optionally pre-fetch) and branch resolution unit 103, which are within the same pipeline stage. Fetch and branch resolution unit 103 passes signals to control store 101 and decode unit 102 as described in further detail below.

Decoded instructions are issued from decode unit 102 to an execution unit 104 and/or load/store unit 107 within the next pipeline stage. Those skilled in the art will recognize that processor 100 may optionally include multiple execution units operating in parallel, including different types of execution units (e.g., integer or fixed point, floating point, etc.) and multiple implementations of a particular type of execution unit (e.g., 2–3 integer units). Finally, a register file 105 receives the results from executed instructions from execution unit 104, while data store (data cache) 106, under the control of load/store unit 107) stages data (operands and executed instruction results) to and from system memory.

The main factors contributing to a large branch penalty within existing pipelined processor designs are the length of the pipeline and the separation of the instruction fetch stage from the branch detection and branch processing stages. To achieve high performance while maintaining micro-architecture simplicity, the present invention employs a novel fetch-branch processing technique which has only a 1-cycle branch penalty and therefore does not require any branch prediction scheme. The processor 100 of the present invention relies on a short and simple pipeline in which the fetch and branch detection and processing are merged into the same pipeline stage.

Additionally, in order to increase the speed of instruction flow from the control store 101 to the execution unit(s) 104, the fetch and branch resolution unit 103 is situated within the same pipeline stage as the decode unit 102. The number of cycles elapsing between a decision on a branch resolution and fetching and issuing an instruction is also reduced by this structure. New instructions from control store 101 are directly provided to the decode unit 102, with instruction valid signals coming from the fetch-branch unit 103.

Detection of branch instructions, enabled by proper selection of instruction opcodes within the instruction set architecture (ISA), is perfomed by the fetch-branch unit 103 in parallel with normal instruction decoding by the decode unit 102. The fetch-branch unit detects any branch instructions and labels all instructions (not just branch instructions) with one of the following instruction types:

1. R type: regular instructions in a basic instruction block; non-speculative instructions executed normally by the execution unit(s) 104.
2. B type: branch instruction; these instructions are completely decoded and processed by fetch-branch unit 103.
3. S type: instructions fetched from (sequential) locations immediately following a branch instruction; these represent speculative instructions which should not be executed if the branch resolves to be a taken branch.
4. T type: instructions fetched from the branch target address and locations following the branch target address; these also represent speculative instructions which should not be executed in the event of the branch not being taken.

In a superscalar processor design, multiple instructions are received from the control store 101 and processed by the decode unit 102 and fetch-branch unit 103 during each cycle. The complete branch instruction processing proceeds as follows:

Cycle 1:

1. A check is performed on each instruction received from the control store 101 by the fetch-branch unit 103 to determine if any instruction received during that cycle is a branch instruction. (If no branch is detected among the retrieved instructions, this cycle is repeated). All instructions preceding a first branch instruction within the group of instructions received are marked R type, the first branch instruction within the group is marked B type, and any remaining instructions are marked S type.
2. Regardless of whether a branch is detected in the group of instructions retrieved, the next fetch address—calculated in parallel with branch processing—is always the address pointing to the next instruction after the last retrieved instruction (the last instruction received during the cycle). If a branch was detected, this fetch address corresponds to a speculative fetch for S type instructions.

3. After determining the type of branch (e.g., condition or unconditional, absolute/relative to a register, etc.) an access to any registers required for target address calculation is performed.

Cycle 2:
1. If a branch was detected during the first cycle, the instructions received during this cycle are marked as S type for decode. If any of these instructions is another branch (or any instruction marked S type during the first cycle), processing is delayed by marking the instruction invalid. Such S type branch instructions will be reprocessed after the current branch processing is completed.
2. The target address is calculated depending upon the type of branch, and the next fetch address is provided by this target address (the instruction fetch on this target address is also a speculative fetch providing T type instructions). If any registers required for target address calculation are not available, the branch processing remains in this state until the required register(s) contain valid values.
3. If any condition code registers are required (for conditional branches), the access to the condition code is initiated during this cycle.

Cycle 3:
1. Instructions received (retrieved) during this cycle are marked T type for decode. If any of these instructions is another branch, processing is delayed by marking the instruction invalid, with such instructions being reprocessed after the current branch processing is completed.
2. For unconditional branches, the branch resolution is automatically branch taken.
3. For conditional branches, a branch resolution is made based on the condition code received. If valid condition codes are not available, the processing maintains this state until the valid condition code is received.
4. If the branch resolution is branch taken, the S type instructions are dropped; if the branch resolution is branch not taken, the T type instructions are dropped.
5. The next fetch is performed from location subsequent to the last sequential or target address, depending on whether the branch was taken. Processing on the instructions received resumes as described above for the first cycle.

In summary, once a branch instruction is detected (at the fetch stage itself), while processing the branch during the next two cycles instructions are fetched from both sequential and target addresses. During the last cycle (Cycle 3), as the branch is being resolved, instructions worth only 1 cycle (either sequential or target instructions) are dropped, resulting in a 1 cycle, defined branch penalty. The approach therefore provides a very low branch penalty using simple branch processing without resorting to branch prediction to improve performance.

FIG. 2 is a high level flow chart for a process of fetch-branch processing according to one embodiment of the present invention. The process 200 begins with retrieval (receipt) of one or more instructions (step 201) and proceeds to a determination of whether the instruction(s) comprise or include a branch instruction (step 202). If not, all of the fetched instructions are marked R type and the next group of instructions are fetched (step 203) for identification of branches. If a branch instruction is detected, any instructions preceding the branch instruction are marked R type, the branch instruction is marked B type, and any instructions following the branch instruction are marked S type (step 204). Instructions immediately following the last fetched instruction (i.e., sequential instructions) are then fetched (step 205).

During the next processor cycle, the sequential instructions just fetched are marked S type (step 206) and instructions starting with the instruction located at the branch target address (i.e., target instructions) are fetched (step 207).

During the second processor cycle following the cycle in which a branch instruction was fetched, the just-fetched instructions are marked T type (step 208) and the branch is resolved (step 209). Based upon whether the branch is taken or not (step 210), either the T type instructions are dropped and instructions are fetched from a location immediately following the last sequential instruction (step 211) or the S type instructions are dropped and instructions are fetched from a location immediately following the last target instruction (step 212). In either event, a determination is again made as to whether any of the just-fetched instructions is a branch instruction (step 202) and the process is reiterated.

The simple branch processing technique of the present invention offers advantages due mainly to placement of the merged fetch-branch unit 103 within the same pipeline stage as, and parallel to, the decode unit 102. Delivery of instructions from control store 101 to the decode unit 103 is expedited, while branch processing proceeds in parallel with decoding and computation of the next instruction fetch address(es). Branches are handled with a fixed branch penalty of only 1 cycle, eliminating the need for incorporation of complex branch prediction schemes employed by most contemporary high performance processor designs which, apart from introducing additional control and data path complexities and delays, also involve additional memory structures for maintaining branch history tables. The present invention thus provides an elegant solution for branch processing at low cost and high performance.

Although the present invention has been described in detail, those skilled in the art will understand that various changes, substitutions, and alterations herein maybe made without departing from the spirit and scope of the invention it its broadest form.

What is claimed is:

1. For use in a processor, a branch architecture for limiting branch penalty without branch prediction comprising:
a fetch-branch unit operating in parallel with a decode unit and controlling retrieval of instructions for the decode unit, both the fetch-branch unit and the decode unit receiving the same instruction(s) during a given cycle, wherein the fetch-branch unit, upon detecting a branch instruction during one cycle,
initiates retrieval to both the fetch-branch unit and the decade unit of at least one sequential instruction from a location immediately following a location of a last retrieved instruction during one of a first cycle immediately following the one cycle and a second cycle immediately following the first cycle, and
initiates retrieval to both the fetch-branch unit and the decode unit of at least one target instruction from a target location forte branch instruction during the other of the first cycle immediately following the one cycle and the second cycle immediately following the first cycle.

2. The branch architecture as set forth in claim 1 wherein the fetch-branch unit resolves the branch instruction and, upon resolving the branch instruction, causes both the fetch-branch unit and the decode unit to drop either the at least one sequential instruction or the at least one target instruction.

3. The branch architecture as set forth in claim 2 wherein the fetch-branch unit, upon resolving the branch instruction, initiates retrieval to both the fetch-branch unit and the decode unit of at least one instruction from a location immediately following a location of a last retrieved instruction within either the at least one sequential instruction or the at least one target instruction, depending upon whether a branch is taken.

4. The branch architecture as set forth in claim 1 wherein the fetch-branch unit, upon detecting a branch instruction during the one cycle, marks any fetched instruction preceding the branch instruction with a regular instruction type identifier, marks the branch instruction with a branch instruction type identifier, and marks any fetched instruction succeeding the branch instruction with a sequential instruction type identifier.

5. The branch architecture as set forth in claim 4 wherein the fetch-branch unit, upon not detecting a branch instruction during the one cycle, marks all fetched instruction(s) with the regular instruction type identifier.

6. The branch architecture as set forth in claim 1 wherein the fetch-branch unit marks the at least one sequential instruction with a sequential instruction type identifier.

7. The branch architecture as set forth in claim 1 wherein the fetch-branch unit marks the at least one target instruction with a target instruction type identifier.

8. A processor comprising:
   at least one execution unit;
   a decode unit; and
   a branch architecture for limiting branch penalty without branch prediction comprising:
      a fetch-branch unit operating in parallel with the decode unit and controlling retrieval of instructions for the decode unit, both the fetch-branch unit and the decode unit receiving the same instruction(s) during a given cycle, wherein the fetch-branch unit, upon detecting a branch instruction during one cycle,
         initiates retrieval to both the fetch-branch unit and the decode unit of at least one sequential instruction from a location immediately following a location of a last retrieved instruction during one of a first cycle immediately following the one cycle and a second cycle immediately following the first cycle, and
         initiates retrieval to both the fetch-branch unit and the decode unit of at least one target instruction from a target location for the branch instruction during the other of the first cycle immediately following the one cycle and the second cycle immediately following the first cycle.

9. The processor as set forth in claim 8 wherein the fetch-branch unit resolves the branch instruction and, upon resolving the branch instruction causes both the fetch-branch unit and the decode unit to drop either the at least one sequential instruction or the at least one target instruction.

10. The processor as set forth in claim 9 wherein the fetch-branch unit, upon resolving the branch instruction, initiates retrieval to both the fetch-branch unit and the decode unit of at least one instruction from a location immediately following a location of a last retrieved instruction within either the at least one sequential instruction or the at least one target instruction, depending upon whether a branch is taken.

11. The processor as set forth in claim 9 wherein the fetch-branch unit, upon detecting a branch instruction during the one cycle, marks any fetched instruction preceding the branch instruction with a regular instruction type identifier, marks the branch instruction with a branch instruction type identifier, and marks any fetched instruction succeeding the branch instruction with a sequential instruction type identifier.

12. The processor as set forth in claim 11 wherein the fetch-branch unit, upon not detecting a branch instruction during the one cycle, marks all fetched instruction(s) with the regular instruction type identifier.

13. The processor as set forth in claim 8 wherein the fetch-branch unit marks the at least one sequential instruction with a sequential instruction type identifier.

14. The processor as set forth in claim 8 wherein the fetch-branch unit marks the at least one target instruction with a target instruction type identifier.

15. For use in a processor, a method of processing branch instructions without branch prediction comprising:
   operating a fetch-branch unit in parallel with a decode unit to control retrieval of instructions for the decode unit, wherein the same instruction(s) are retrieved to bath the fetch-branch unit and the decode unit during a given cycle; and
   upon detecting a branch instruction during one cycle,
      initiating retrieval to both the fetch-branch unit and the decode unit of at least one sequential instruction from a location immediately following a location of a last retrieved instruction during one of a first cycle immediately following the one cycle and a second cycle immediately following the first cycle, and
      initiating retrieval to both the fetch-branch unit and the decode unit of at least one target instruction from a target location for the branch instruction during the other of the first cycle immediately following the one cycle and the second cycle immediately following the first cycle.

16. The method as set forth in claim 15 further comprising:
   resolving the branch instruction; and
   upon resolving the branch instruction, causing both the fetch-branch unit and the decode unit to drop either the at least one sequential instruction or the at least one target instruction.

17. The method as set forth in claim 16 further comprising:
   upon resolving the branch instruction, retrieving, to both the fetch-branch unit and the decode unit, at least one instruction from a location immediately following a location of a last retrieved instruction within either the at least one sequential instruction or the at least one target instruction, depending upon whether a branch is taken.

18. The method as set forth in claim 15 further comprising:
   upon detecting a branch instruction during the one cycle,
   marking any fetched instruction preceding the branch instruction with a regular instruction type identifier,
   marking the branch instruction with a branch instruction type identifier, and
   marking any fetched instruction succeeding the branch instruction with a sequential instruction type identifier.

19. The method as set forth in claim 18 further comprising:
   upon not detecting a branch instruction during the one cycle, marking all fetched instruction with the regular instruction type identifier.

20. The method as set forth in claim 15 further comprising:
   marking the at least one sequential instruction with a sequential instruction type identifier; and
   marking the at least one target instruction with a target instruction type identifier.

* * * * *